(12) United States Patent
Singh et al.

(10) Patent No.: US 12,481,789 B2
(45) Date of Patent: Nov. 25, 2025

(54) REAL-TIME MASKING OF SENSITIVE INFORMATION IN CONTENT SHARED DURING A SCREEN SHARE SESSION OF A VIDEO CALL

(71) Applicant: INTUIT INC., Mountain View, CA (US)

(72) Inventors: Avinash Singh, Bengaluru (IN); Shekhar Dokania, Bengaluru (IN); Vivek Prasad, Bengaluru (IN); Bhaskar Gupta, Bengaluru (IN); Bhargava Narayana, Bengaluru (IN)

(73) Assignee: Intuit Inc., Mountain View, CA (US)

( * ) Notice: Subject to any disclaimer, the term of this patent is extended or adjusted under 35 U.S.C. 154(b) by 57 days.

(21) Appl. No.: 18/618,400

(22) Filed: Mar. 27, 2024

(65) Prior Publication Data

US 2025/0307467 A1 Oct. 2, 2025

(51) Int. Cl.
| | |
|---|---|
| *G06F 21/62* | (2013.01) |
| *G06V 20/40* | (2022.01) |
| *G06V 20/62* | (2022.01) |
| *G06V 30/41* | (2022.01) |

(52) U.S. Cl.
CPC .......... *G06F 21/6263* (2013.01); *G06V 20/41* (2022.01); *G06V 20/46* (2022.01); *G06V 20/62* (2022.01); *G06V 30/41* (2022.01)

(58) Field of Classification Search
CPC .... G06F 21/6263; G06V 20/41; G06V 20/46; G06V 20/62; G06V 30/41
See application file for complete search history.

(56) References Cited

U.S. PATENT DOCUMENTS

| | | |
|---|---|---|
| 9,141,332 B2 | 9/2015 | Coleman et al. |
| 2015/0113664 A1* | 4/2015 | Aad ................ G06V 40/172 726/27 |
| 2023/0044146 A1* | 2/2023 | Xue ................ G06V 20/41 |
| 2023/0333803 A1* | 10/2023 | Su ................ H04M 1/72469 |
| 2023/0401277 A1 | 12/2023 | Ronan et al. |
| 2024/0331381 A1* | 10/2024 | Paiuk ................ G06V 20/46 |
| 2025/0087151 A1* | 3/2025 | Wang ................ H10K 59/1216 |

* cited by examiner

*Primary Examiner* — Anh Nguyen
(74) *Attorney, Agent, or Firm* — Patterson + Sheridan, LLP; B. Todd Patterson

(57) ABSTRACT

Aspects of the present disclosure relate to real-time masking of sensitive information in content shared during a screen share session of a video call. Aspects include determining a first computing device on the video call has accepted a request for the screen share session from a second computing device on the video call. Aspects include, in response to the determining, adjusting a parameter of a video stream depicting content displayed on a display of the first computing device. Aspects include processing a video frame of a plurality of video frames included in the video stream to identify sensitive information depicted in the video frame. Aspects include modifying the video frame to mask the sensitive information. Aspects include transmitting the modified video frame to the second computing device for viewing on a display of the second computing device.

16 Claims, 10 Drawing Sheets

REAL-TIME MASKING OF SENSITIVE INFORMATION IN CONTENT SHARED DURING A SCREEN SHARE SESSION OF A VIDEO CALL

INTRODUCTION

Aspects of the present disclosure relate to video calls. In particular, aspects of the present disclosure relate to techniques for real-time masking (e.g., covering, blurring, etc.) of sensitive information included in content shared during a screen share session of a video call.

BACKGROUND

Every year millions of people, businesses, and organizations around the world use software applications to help manage aspects of their lives. Software applications may offer live support to customers, connecting those customers requesting assistance with experts capable of providing the requested assistance.

A customer using a software application to prepare a document, such as a financial document, may request live support, specifically a video call, with an expert. In order to provide the requested assistance, the expert may view the customer's screen during the video call. To that end, the expert may send the customer a request for a screen share session. Upon accepting the request, the customer may select what content the customer wishes to screen share with the expert and, once selected, the content may screen shared with the expert. More specifically, a video stream of the selected content being displayed on a display of a computing device used by the customer may be transmitted to a computing device used by the expert and displayed on a display of the computing device used by the expert. In this manner, the expert may view the content being displayed on the display of the computing device used by the customer.

BRIEF SUMMARY

Certain embodiments provide a method for real-time masking of personal information in content shared during a screen share session of a video call includes: determining a first computing device on the video call has accepted a request for the screen share session from a second computing device on the video call; in response to the determining, adjusting a parameter of a video stream depicting content displayed on a display of the first computing device; processing a video frame of a plurality of video frames included in the video stream to identify sensitive information depicted in the video frame; modifying the video frame to mask the sensitive information; and transmitting the modified video frame to the second computing device for viewing on a display of the second computing device.

Other embodiments comprise systems configured to perform the method set forth above as well as non-transitory computer-readable storage mediums comprising instructions for performing the method set forth above.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
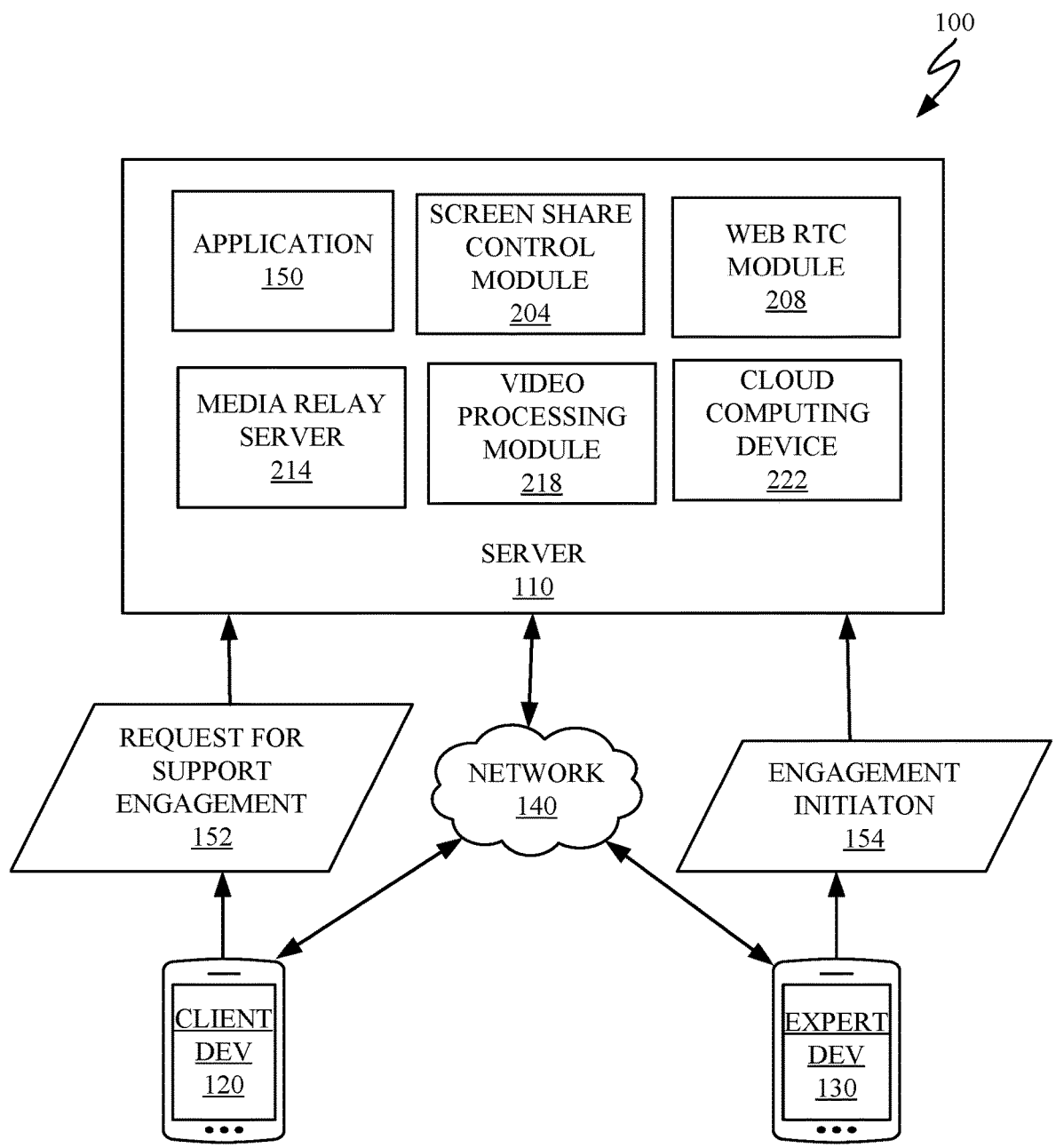
FIG. 1 depicts an example computing environment for providing live support to a customer of a software application according to some aspects of the present disclosure.

Aspects of the present disclosure provide apparatuses, methods, processing systems, and computer-readable mediums for masking sensitive information included in content shared during a screen share session of a video call.

Conventional techniques for masking sensitive information in a web page shared during a screen share session of a video call are typically limited to masking sensitive information that has been pre-identified (e.g., marked) as sensitive. For example, hypertext markup language (HTML) code for a web page that includes sensitive information must identify (e.g., flag) the sensitive information beforehand (e.g., in advance of a screen share session). Therefore, conventional techniques cannot identify and mask sensitive information in real-time or near real-time during a screen share session of a video call. Furthermore, conventional techniques are typically limited to masking sensitive information in web pages and therefore cannot mask sensitive information in other types of content, such as a hand-written document or independent applications (e.g., banking applications), that may be shared (e.g., purposefully or inadvertently) during the screen share session of the video call.

Example aspects of the present disclosure are directed to techniques for real-time masking of sensitive information included in content (e.g., web page, hand-written document, etc.) shared during a screen share session of a video call. Once a screen share session is established between a client device and an expert device, the disclosed techniques include adjusting a frame rate associated with a video stream being shared from, for example, the client device to a frame rate (e.g., ranging from 1 frame per second to 3 frames per second) that provides additional time to facilitate real-time processing of the video stream. It should be understood that, in the context of video streaming, real-time may refer to something that occurs within one second or less, or otherwise may refer to something that occurs within a time window (e.g., 100 milliseconds to 600 milliseconds) that is not long enough to cause a substantially noticeable delay in the video stream.

The video stream includes a plurality of video frames, and each of the video frames may represent an image of the shared content at a particular instance of time. For example, an initial video frame of the video stream represent an initial image of the shared content at a first instance of time, whereas a subsequent video frame of the video stream represents a subsequent image of the shared content at a second instance of time. To process the video stream, one or more image processing techniques to extract text included in each respective video frame (e.g., of displayed content) of the video stream. In addition, one or more search techniques may be implemented on the extracted text to determine whether the respective video frame depicts sensitive information. As an example, the search techniques for detecting sensitive information may include searching for regular expressions. A regular expression, or RegEx, is a pattern used to match character combinations in strings of text. Regular expressions may be used in detecting sensitive information, such as credit card information, date of birth, phone number, having a standard format. Regular expressions are typically less effective in detecting other types of sensitive information, such as a legal name of an individual. To that end, other search techniques may be implemented to detect such types of sensitive information. For example, a search technique for detecting a name (e.g., first, middle, last) may include detecting keywords (e.g., "First Name", "Last Name", etc.) that may indicate extracted text following such keywords contains sensitive information.

Once the sensitive information depicted in a video frame of the video stream is identified, the video frame may be modified to mask the identified sensitive information. For example, in some embodiments, an opaque (e.g., not transparent) polygon may be applied to one or more locations (e.g., coordinates) of the video frame that correspond to locations of the identified sensitive information. The modified video frame may then be transmitted to the expert device. In this manner, the modified video frame may be displayed on a display of the expert device for viewing by the recipient (e.g., expert). In alternative embodiments, multiple video frames of the video stream may be processed and communicated in batch.

Example aspects of the present disclosure provide numerous technical effects and benefits. For example, by slowing down the video frame of the video stream shared during a screen share session of a video call, the disclosed techniques may enable scanning of individual video frames of the video stream to identify sensitive information and modify those video frames to mask the sensitive information before transmitting the video frames to a recipient device for viewing by a recipient without causing any noticeable delay (e.g., lag) in the video stream. In this manner, the disclosed techniques allow sensitive information in video frames of the video stream to be identified and masked in real-time or near real-time.

Furthermore, identifying and masking sensitive information in real-time or near real-time during a screen share session of a video call, such as by extracting text present in video frames depicting content being shared and searching the text for patterns and/or other indicators of sensitive information during processing performed before the video frames are transmitted to a recipient device, allows the disclosed techniques to, in contrast to conventional techniques for masking sensitive information, identify and mask sensitive information that has not been previously marked as sensitive and/or sensitive information included in other content besides web pages, such as hand-written documents, that may not pre-identify (e.g., mark) sensitive information. In this manner, the disclosed techniques allow for real-time or near real-time masking of sensitive information included in more types of content (e.g., hand-written documents) than was possible with conventional techniques, which were generally limited to masking sensitive information included in web pages.

Techniques described herein improve data privacy and computing security by dynamically identifying and masking sensitive information depicted in video frames of a video stream prior to transmitting the video frames to a recipient device, thereby automatically preventing the unauthorized disclosure of private information and/or data that could compromise the security of a computing system (e.g., login credentials) in the context of a live streaming video session (e.g., video call). In conventional video streaming systems, many instances of sensitive information would not be automatically identified, and would be transmitted without masking, such as sensitive information that has not been previously identified or marked as sensitive. With embodiments described herein, these instances of sensitive information are automatically identified and masked prior to transmission to a recipient device as a result of techniques that may involve reducing a frame rate of a video stream to provide additional time to process individual video frames of the video stream, extracting text from the video frames using techniques such as optical character recognition (OCR) or other services as appropriate, searching such extracted text to identify patterns and/or other indicators of sensitive information (e.g., using rules, machine learning, and/or other logic), and automatically masking identified sensitive information depicted in the video frames prior to transmission to the recipient device.

Example Computing Environment for Providing Live Support

FIG. 1 depicts an example computing environment 100 for providing live support.

The computing environment 100 includes a server 110, a client device 120, and an expert device 130 connected over a network 140. The network 140 may be representative of any type of connection over which data may be transmitted, such as a wide area network (WAN), local area network (LAN), cellular data network, and/or the like.

The server 110 generally includes a computing device, such as a server computer. The server 110 includes an application 150, which generally represents a computing application that a user interacts with over the network 140 via the client device 120.

The client device 120 generally represents a computing device such as a mobile phone, laptop or desktop computer, tablet computer, or the like. The client device 120 is used to access the application 150 over the network 140, such as via a user interface (e.g., web browser) associated with the client device 120. In alternative embodiments, the application 150 is located on the client device 120. The client device 120 allows a user to request a support engagement and to communicate with an expert during the support engagement, such as to resolve issues related to use of the application 150. The client device 120 is representative of a plurality of client devices operated by a plurality of different users of the application 150.

The expert device 130 generally represents a computing device such as a mobile phone, laptop or desktop computer, tablet computer, or the like. The expert device 130 is operated by an expert in order to participate in support engagements. The expert device 130 is representative of a plurality of expert devices operated by a plurality of experts. Support engagements may include, for example, communication with a user (e.g., via video), performing actions to resolve issues (e.g., modifying configuration information, sending files or information, remotely controlling the user's device, and the like), recording notes and milestones, and the like.

In some embodiments, a request 152 for a support engagement may be sent from the client device 120 to the server 110, such as in response to a user of the client device 120 clicking on a user interface element to request a support engagement. The request 152 for the support engagement may include information related to the requested support engagement, such as a product identifier (e.g., based on input from the user), a user identifier of the user, context data related to use of the application 150 by the user, and the like.

The application 150 may receive the request 152 for the support engagement and may perform operations to match the request 152 with one of a plurality of different experts. Once the request 152 for the support engagement is matched with an expert, the application 150 may initiate the support engagement by sending an engagement initiation 154 to the expert device 130 of the matched expert.

In some embodiments, the expert at the expert device 130 may provide the requested support for the customer at the client device 120 through a video call. During the video call, the expert may request a screen share with the customer. For example, a screen share request may be sent from the expert device 130 to the client device 120 via the network 140. Once the customer accepts the screen share request and selects the content the customer wishes to share with the expert, the screen share may be initiated and the selected content may be displayed on the expert device 130. For example, in some embodiments, the application 150 may be associated with preparing a document, such as a financial document, and the selected content may be a web page (e.g., as illustrated in FIG. 3C) associated with the application 150. More specifically, the web page may be a user interface associated with the application 150 and by which the customer enters information the application 150 needs to prepare the document.

Example Sequence for Masking Personal Information in a Video Call

Figure 2:
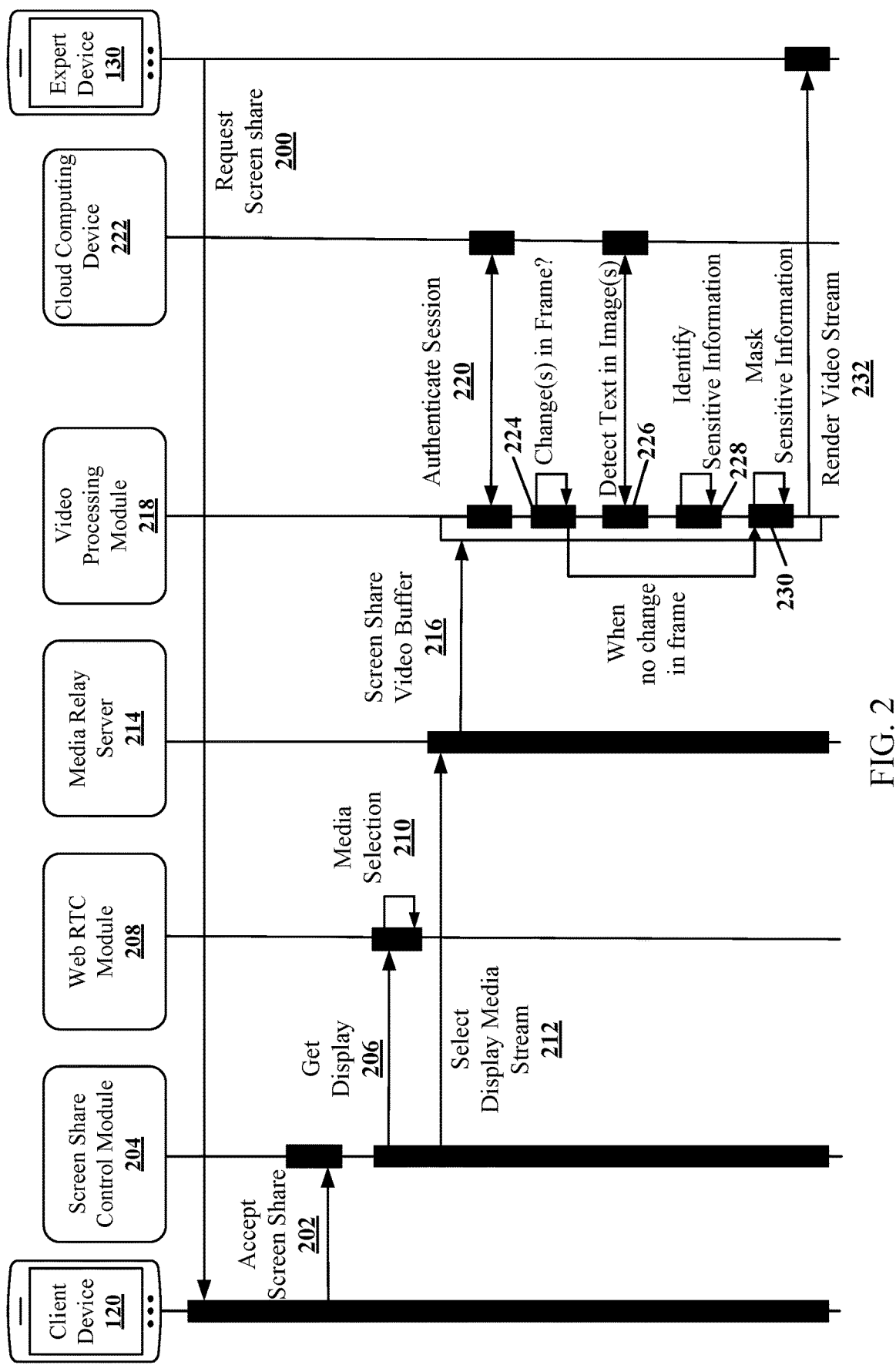
FIG. 2 depicts a sequence diagram for real-time identification and masking of personal information included in content shared during a video call according to some aspects of the present disclosure.

FIG. 2 illustrates a sequence diagram of a technique for real-time masking of sensitive information included in content shared during a screen share session of a video call according to some embodiments of the present disclosure. For simplicity, the sequence diagram will be discussed in the context of a video call between the client device 120 of the expert device 130 of the computing environment 100 discussed above with reference to FIG. 1. It should be understood, however, that the disclosed technique for real-time masking of sensitive information in content shared during a screen share session of a video call may be implemented between any two computing devices capable of communicating with one another.

At 200, the expert device 130 sends a request for a screen share session to the client device 120. For example, the request may be communicated from the expert device 130 to the client device 120 via one or more networks (e.g., the network 140 illustrated in FIG. 1).

At 202, the client device 120 accepts the request for the screen share session. For example, a notification of the request for the screen share session may be displayed on a display of the client device 120. The customer may interact with one or more input devices (e.g., keyboard, mouse, touchscreen, etc.) of the client device 120 to accept the request for the screen share session. The customer's acceptance of the request for the screen share session may be provided as an input to a screen share control module 204 (e.g., computer executable instructions) associated with establishing a screen share session between the client device 120 and the expert device 130. In some embodiments, the screen share control module 204 may reside on a server (e.g., the server 110 illustrated in FIG. 1).

At 206, the screen share control module 204 may send an application programming interface (API) call (e.g., labeled "Get Display") to a web real-time communication (RTC) module 208 configured to facilitate real-time voice, text, and video communications between web browsers and devices, such as the client device 120 and the expert device 130. Upon receiving the API call from the screen share control module 204, the web RTC module 208 may perform one or more tasks 210 (e.g., labeled "Media Selection") associated with establishing a media stream between the client device 120 and the expert device 130 so that the client device 120 may screen share content with the expert device 130.

At 212, the screen share control module 204 may provide the media stream to a media relay server 214. In some embodiments, the media stream may include an audio stream and a video stream. In other embodiments, the media stream may only include the video stream. As shown, at 216, the media relay server 214 may provide the video stream to a video processing module 218. In some embodiments, the video processing module 218 may be included in the client device 120. In alternative embodiments, the video processing module 218 may be running on a computing device (e.g., the server 110 illustrated in FIG. 1) that is remote relative to the client device 120.

At 220, the video processing module 218 may authenticate a session with a cloud computing device (e.g., associated with Amazon Web Services®) configured to perform one or more image processing techniques on an image, such as a video frame, to extract text included therein. For example, if the image is a web page that includes text and images, the cloud computing device may be configured to apply the image processing technique(s) to the image to extract the text that is included in the web page. In some embodiments, image processing techniques may involve optical character recognition (OCR) and/or other text extraction techniques. For example, if an image includes text that is not in a machine-readable format, such as a scanned or photographed document (e.g., typed or handwritten), OCR techniques or other text extraction techniques may be performed to extract text from such an image.

In some embodiments, the video processor may provide an initial video frame of the video stream to the cloud computing device 222 for processing. Thus, the cloud computing device 222 may process the initial video frame of the video stream to extract any text depicted in the initial video frame. The extracted text, if any, may then be provided to the video processing module 218.

The video processing module 218 may determine whether the text extracted from the initial video frame of the video stream is sensitive information. For example, the video processing module 218 may be configured to implement a regular expression searching technique which allows the video processing module 218 to find specific patterns, such as words, phrases, or character combinations, in the text extracted from the initial video frame to identify sensitive information that needs to be masked (e.g., covered, blurred, etc.). Regular expressions are included as an example, and other searching techniques are possible. For example, searching techniques may involve other types of rules and/or logic for identifying sensitive information and/or may involve the use of one or more machine learning models trained to identify sensitive information in text (e.g., through a supervised learning process based on labeled training data including text strings labeled with indications of whether the text strings include sensitive information).

If the video processing module 218 identifies sensitive information in the initial video frame of the video stream, the video processing module 218 may modify the initial video frame to mask the sensitive information. For example, the video processing module 218 may identify a location or locations of the initial video frame that include the sensitive information and may then apply an opaque (e.g., not transparent) polygon over the identified location(s) so as to mask the sensitive information. An opaque polygon is included as an example, and other masking techniques are possible. For example, sensitive information may be blurred, replaced (e.g, with dummy information), warped, and/or otherwise modified in such a manner that the sensitive information cannot be recognized in the modified video frame. In some embodiments, the video processing module 218 may then transmit the modified initial video frame to the expert device 130. In alternative embodiments, the video processing module 218 may process one or more additional video frames of the video stream and then send the modified initial video frame and the one or more additional video frames to the expert device 130 for viewing by the expert.

In some embodiments, the video processing module 218 may compare a current video frame of the video stream to a prior video frame of the video stream that immediately precedes the current video frame to determine whether the current video frame differs from the prior video frame by a threshold amount. For example, in some embodiments, the video processing module 218 may convert the current video frame and the prior video frame to grayscale video frames to allow for a comparison of the intensity levels of pixels in the two frames. In some embodiments, the video processing module 218 may compute an aggregated grayscale value of the current video frame and an aggregated grayscale value of the prior video frame. The aggregated grayscale value may refer to a single value that represents the overall brightness or intensity of a video frame and is calculated by summing the intensity levels of all the pixels in the video frame and then taking the average to obtain the single value. The video processing module 218 may determine the current video frame differs from the prior video frame based on a comparison of the aggregated grayscale value of the current video frame and the aggregated grayscale value of the prior video frame. For example, the video processing module 218 may determine the current video frame of the video stream differs from the prior video frame of the video stream if the aggregated grayscale value of the current video frame differs from the aggregated grayscale value of the prior video frame by a threshold amount (e.g., at least 10 percent). Stated another way, the video processing module 218 may determine the current video frame is not substantially the same as the prior video frame if the current video frame is not at least 90% the same as the prior video frame based on comparing the aggregated grayscale value of the two frames. Also, given the video quality (e.g, at least 720p) associated with the video stream during the screen share session, converting the two video frames (e.g., current video frame and prior video frame) to grayscale video frames allows for the two video frames to be compared in a more computationally efficient manner (e.g., minimizes computing resources needed for the comparison).

If the video processing module 218 determines the current video frame differs from the prior video frame by less than the threshold amount, the video processing module 218 may forego transmitting the current video frame to the cloud computing device 222 for image processing. Instead, the video processing module 218 may modify the current video frame in the same manner as the prior video frame. For example, if the prior video frame was modified to mask (e.g., cover, blur) sensitive information, the current video frame may be modified in the same manner before being transmitted to the expert device 130. If, however, the video processing module 218 determines the current video frame of the video stream differs from the prior video frame of the video stream by the threshold amount, the video processing module 218 may, at 224, transmit the current video frame of the video stream to the cloud computing device 222.

The process performed at 226 may be the same as the process described above with respect to processing of the initial video frame of the video stream. For instance, the current video frame of the video stream may be processed (e.g., using the one or more image processing techniques) to extract text depicted in the current video frame. The cloud computing device 222 may then provide the extracted text to the video processing module 218.

At 228, the video processing module 218 determines whether the text extracted from the current video frame includes sensitive information. For example, the video processing module 218 may, as discussed above with reference to the initial video frame of the video stream, implement one or more search techniques (e.g, regular expression) to determine whether the text extracted from the current video frame of the video stream includes sensitive information. If the video processing module determines the text extracted from the current video frame of the video stream includes sensitive information, the video processing module 218 modifies the current video frame at 230 to mask the sensitive information. Otherwise, the video processing module 218 transmits the current video frame to the expert device 130 without making any modifications (e.g., masking) to the current video frame or, alternatively, transmits the current video frame to a queue that includes one or more video frames of the video stream that have already been processed and are also ready to transmit to the expert device 130.

At 230, the video processing module 218 may, as mentioned above, modify the current video frame of the video stream to mask the identified sensitive information. For example, the video processing module 218 may identify one or more locations (e.g., coordinates) of the current video frame that include the sensitive information and may apply an opaque polygon over the location(s) of the current video frame to mask the sensitive information.

At 232, the video processing module 218 may transmit the modified current video frame of the video stream to the expert device 130 so that the modified, current video frame may be viewed by the expert. Alternatively, the video processing module 218 may add the modified current video frame of the video stream to a queue that includes one or more prior video frames of the video stream that are ready to transmit to the expert device 130.

In some embodiments, the screen share control module 204, the web RTC module 208, the media relay server 214, the video processing module 218, and the computing device 222 may be implemented on the server 110 of the computing environment illustrated in FIG. 1. In alternative embodiments, one or more of these components may be implemented locally on the client device 120. For example, in some embodiments, the video processing module 218 may be implemented on the client device 120. In this manner, the client device 120 may preprocess the video stream to identify and mask sensitive information as discussed above before transmitting for display on the expert computing device 130.

Example of Real-Time Masking of Sensitive Information

FIGS. 3A-3F depicts screens of the client device 120 and 130 expert device during a video call according to some aspects of the present disclosure.

Figure 3A:
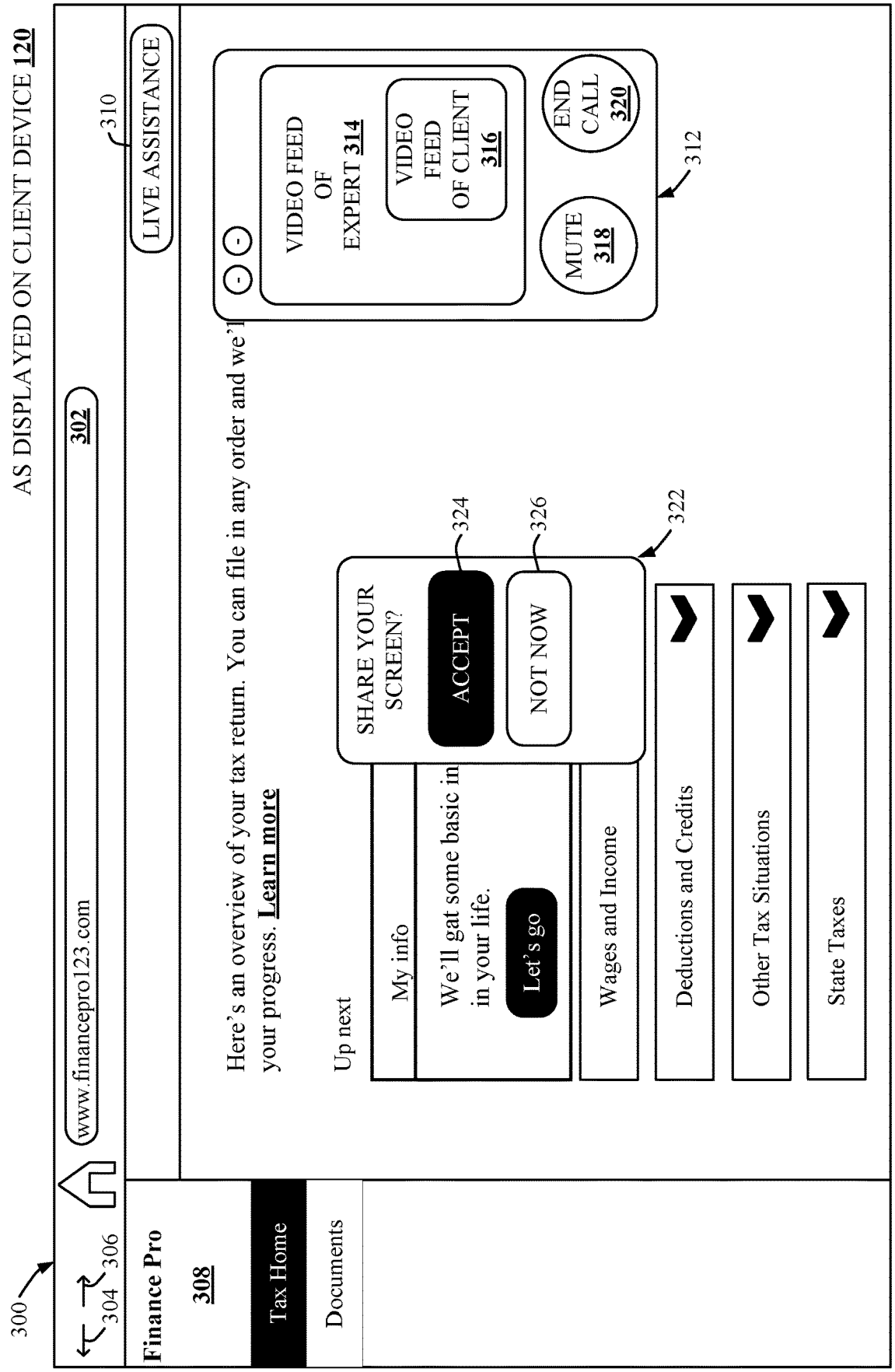
FIG. 3A depicts a screen of a first computing device on a video call with a second computing device displaying a notification window associated with a request received from the second computing device to start a screen share session according to some embodiments of the present disclosure.

FIG. 3A depicts a window 300 of a web browser running on the client device 120 according to some embodiments of the present disclosure. The window 300 represents an instance of the web browser. It should be appreciated that one or more additional instances (e.g., windows) of the web browser may also be running on the client device 120.

As shown, the window 300 of the web browser includes an address bar 302 and navigation user interface elements (e.g., a back arrow 304 and a forward arrow 306) that may be used to navigate from a current web page displayed in the window 300 of the web browser to a different web page. As shown, the current web page displayed in the window 300 of the web browser may be a home page of a website (e.g., www.financepro123.com) entered into the address bar 302. The home page may include a menu bar 308 that includes different user interface elements (e.g., labeled "Tax Home" and "Documents") the customer may select (e.g., click, touch) to navigate to different web pages within the website.

In some embodiments, the homage page of the website includes a user interface element 310 that the customer selected (e.g., click, touch, etc.) to request live support from an expert. The live support may, for example, be a video call with the expert. A video call window 312 is shown positioned over a portion of the window of the web browser. The video call window 312 may include a video feed 314 of the expert and a video feed 316 of the client. It should be understood that the video feed 314 of the expert may be obtained from a multimedia device (e.g., camera) associated with the expert device 130 and the video feed of the client may be obtained from a multimedia device (e.g., camera) of the client device 120.

The video call window 312 may also include one or more user interface elements that the customer may manipulate to control one or more aspects (e.g., audio, video). For example, the one or more user interface elements may include a mute button 318 that the customer may select (e.g., click, touch) to selectively activate an input device (e.g., microphone) of the client device 120 that the customer uses to talk to the expert. The video call window 312 may also include an end call button 320 that the user may select to end the video call with the expert.

To assist the customer, the expert may need the customer to initiate a screen share session with the customer during the video call. To that end, the expert may send a request for a screen share session. The request for the screen share session may, as shown, be displayed on the display of the client device 120 as a notification window 322 positioned over a portion of the window 300 of the web browser. The notification window 322 may include the text "SHARE YOUR SCREEN?" to notify the customer of the request for the screen share session. The notification window 322 may also include user interface elements 324 (e.g., labeled "ACCEPT") and user interface element 326 (e.g., labeled "NOT NOW"). The customer may select (e.g., clicks, touches) user interface element 324 to accept the request for the screen share session. Conversely, the customer may select user interface element 326 to decline the request the request for the screen share session.

Figure 3B:
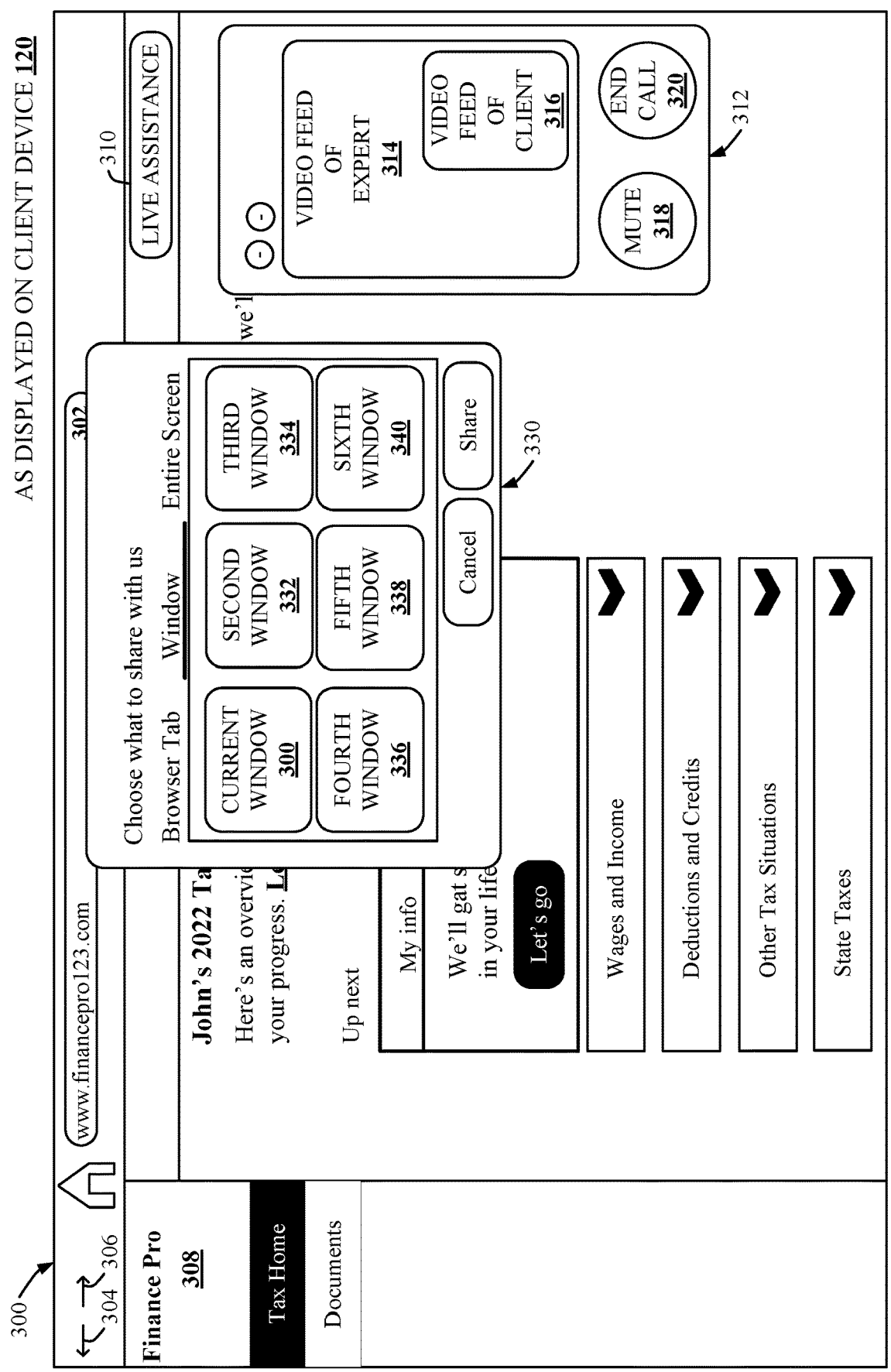
FIG. 3B depicts the screen of the first computing device display a selection window in response to a user of the first computing device accepting the request to start the screen share session with the second computing device according to some embodiments of the present disclosure.
Figure 3C:
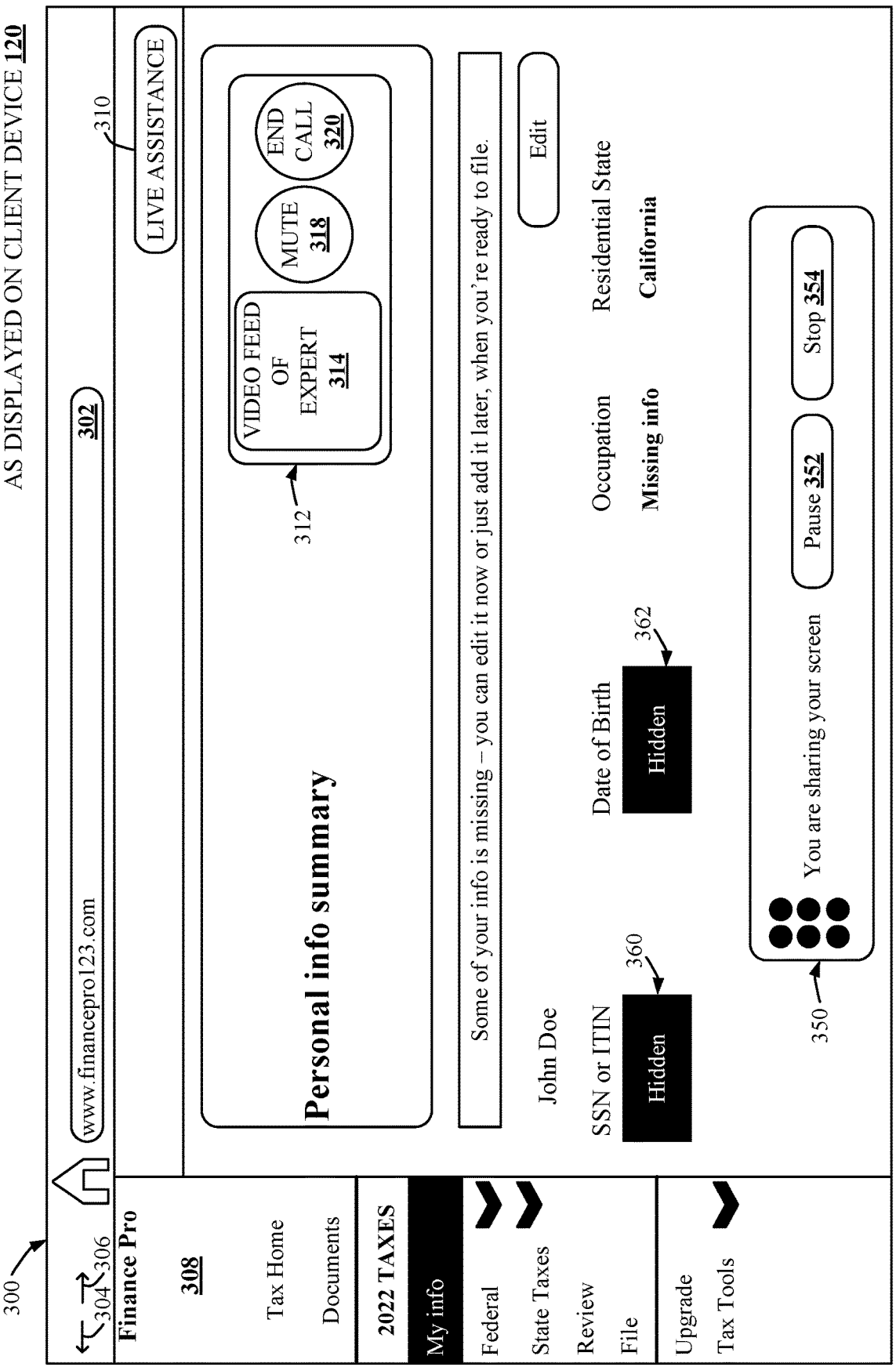
FIG. 3C depicts the screen of the first computing device during the screen share session with the second computing device displaying a web page depicting sensitive information that is masked according to some embodiments of the present disclosure.

FIG. 3B illustrates the window 300 of the web browser after the customer accepts the request for the screen share session according to some embodiments of the present disclosure. As shown, a selection window 330 that is displayed in response to the customer accepting the request for the screen share session is positioned over a portion of the window 300 of the web browser. The selection window 330 allows the customer to select which content the customer wishes to share with the expert during the screen share session.

In some embodiments, the selection window 330 may include a first tab titled "Browser Tab", a second tab titled "Window", and a third tab titled "Entire Screen". As illustrated, the "Window" tab is selected such that the selection window 330 displays different windows (e.g., instances of the web browser) that the customer can choose to share during the screen share session. The different windows may include the window 300 of the web browser that is currently displayed on the screen of the client device 120 and one or more additional windows of the web browser, such as a second window 332, a third window 334, a fourth window 336, a fifth window 338, and a sixth window 340, that are minimized or in the background (e.g., positioned behind the window 300 of the web browser) and therefore not visible on the display of the client device 120.

The customer may select (e.g., click touch) one of the multiple different windows listed in the selection window 330 and may then select user interface element 344 (e.g., labeled "Share") to begin sharing the selected window so that the selected window may be displayed on the display of the expert device 130 for viewing by the expert. Alternatively, the customer may select to share the entire screen (e.g., display) of the client device 120. For simplicity, the discussion of FIG. 3C, FIG. 3D, FIG. 3E, and FIG. 3F will assume the customer selected to share the entire screen of the client device 120. However, it should be appreciated that the concepts illustrated in FIGS. 3C, 3D, 3E, and 3F would be the same if the customer selected to share a particular window (e.g., instance of the web browser) or a particular tab (e.g., web page) of a plurality of tabs included within a particular window.

FIG. 3C depicts the screen of the client device 120 after the customer selected to share the entire screen of the client device 120 according to some embodiments of the present disclosure. As shown, the screen of the client device 120 displays the window 300 of the web browser and a screen share control window 350. The screen share control window 350 is associated with the screen share session and, as shown, may be positioned over a portion of the window 300 of the web browser. The screen share control window 350 includes text "You are sharing your screen" to notify the customer that an active screen share session is in progress. The screen share control window 350 also includes user interface control 352 (e.g., labeled "Pause") and user-interface control 354 (e.g., labeled "Stop") that the user may select to either pause the screen share session or end the screen share session.

As shown, the window 300 of the web browser may display a web page of the website (e.g., wwww.financeprowebsite.com) that includes sensitive information about the customer. For example, the web page may include a first field 360 populated with the customer's social security number and a second field populated with the customer's date of birth. Although such personal information is needed to prepare a financial document (e.g., tax return) for the customer, the customer may not want this sensitive information shared with the expert during the screen share session of the video call.

In some embodiments, the sensitive information displayed on the web page displayed in the window 300 of the web browser may be masked (e.g., hidden, covered) during the screen share session. For example, as illustrated in FIG. 3C, one or more video frames associated with a video stream for displaying content on the screen of the client device 120 may be modified to include an opaque (e.g., not transparent) polygon before being displayed on the screen of the client device 120. More specifically, the opaque polygon may be positioned over locations of the one or more video frames that depict the sensitive information. In this manner, the sensitive information may not be visible to the customer during the screen share session.

Figure 3D:
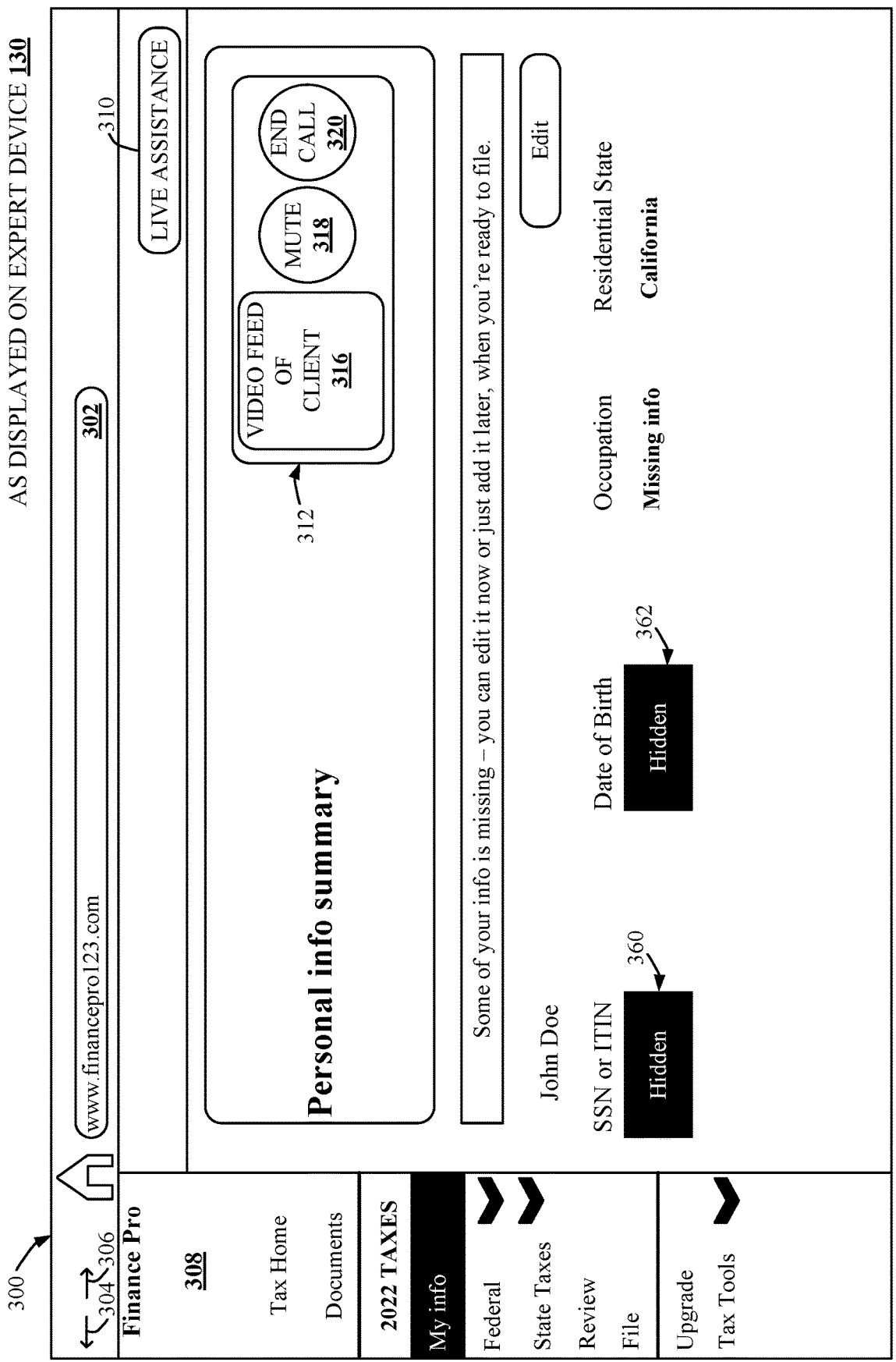
FIG. 3D depicts a screen of the second computing device displaying the web page in FIG. 3C with the sensitive information masked according to some embodiments of the present disclosure.

FIG. 3D illustrates the content depicted in FIG. C as displayed on the screen of the expert device 130 according to some embodiments of the present disclosure. As shown, the sensitive information depicted in the content (e.g., web page of website displayed in the window 300 of the web browser) displayed on the screen of the expert device 130 is masked (e.g., hidden, covered) so that the sensitive information is not visible to the expert. It should be understood that the video stream of the content displayed on the screen of the expert device 130 may be modified using the techniques discussed above with reference to FIG. 2 to mask in real-time or near real-time the sensitive information depicted in the content. For instance, one or more video frames of the video stream associated with the screen share session and depicting the content (e.g., the web page of the website displayed in window 300 of the web browser) displayed on the screen of the client device 120 may be modified to mask the sensitive information (e.g., first field 360 and second field 362) so that the identified sensitive information is hidden from the expert viewing the video stream at the expert device 130.

Figure 3E:
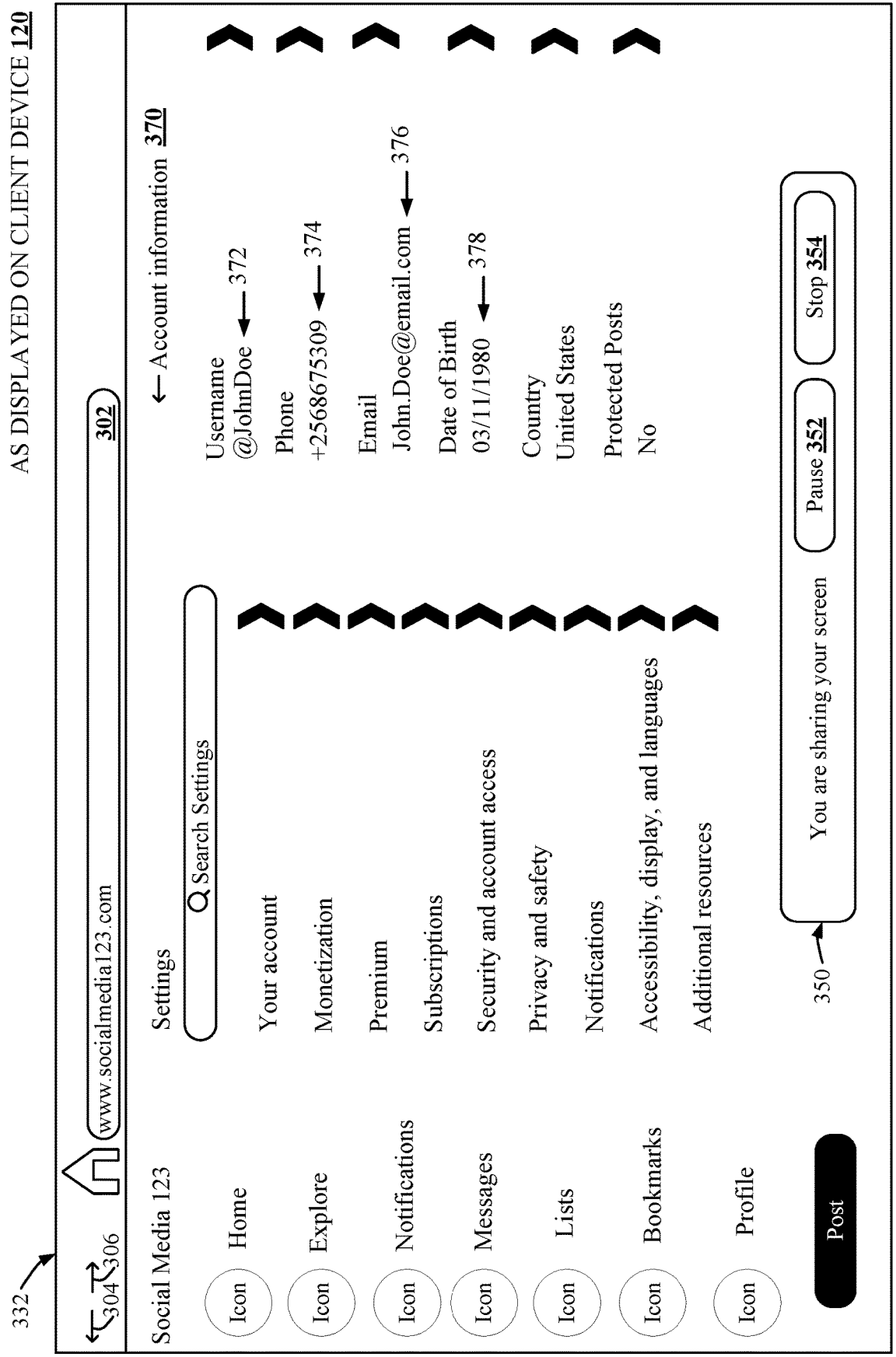
FIG. 3E depicts another window of a web browser as displayed on a client device during a screen share session and including sensitive information according to some embodiments of the present disclosure.
Figure 3F:
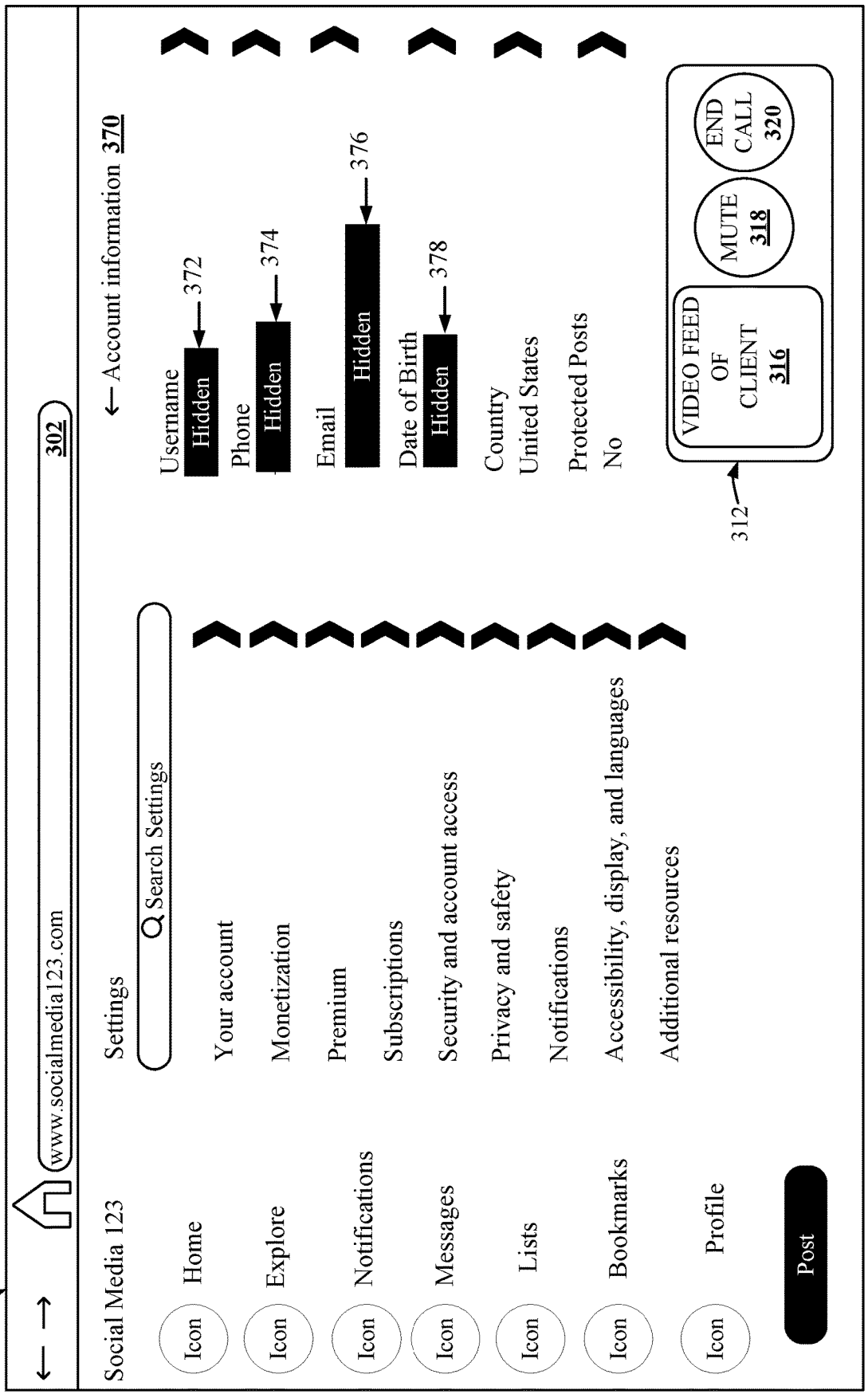
FIG. 3F depicts the window of the web browser of FIG. 3E as displayed on an expert device during a screen share session with the sensitive information included in the window being masked in real-time according to some embodiments of the present disclosure.

FIGS. 3E and 3F illustrates the screen of the client device 120 (FIG. 3E) and the screen of the expert device 130 (FIG. 3F) when the second window 332 of the web browser is displayed on the screen of the client device 120 during the screen share session of the video call according to some embodiments of the present disclosure.

In some embodiments, the second window 332 of web browser may display a web page of a social media website (e.g., www.socialmedia123.com). The web page includes account information 370 for the customer's account on the website. The account information 370 may include a username 372 for the customer, contact information for the customer (e.g., phone number 374 and e-mail address 376), and a date of birth 378 of the customer.

While sharing the entire screen of the client device 120 during the screen share session of the video call, the customer may navigate from the window 300 of the web browser depicting the content for which the customer requested live support to the second window 332 of the web browser. In this manner, the second window 332 of the web browser may be displayed on the screen of the client device 120. For example, the customer may inadvertently navigate to the second window 332 of the web browser while trying to navigate to a different window of the web browser, such as a window of the web browser displaying a website of a governmental agency (e.g., internal revenue services) that customer visited to better understand an issue for which the customer ultimately requested live support in the form of the video call with the expert.

To maintain the customer's privacy, video frames of the video stream (e.g., of the entire screen of the client device 120) associated with the screen share session and depicting the second window 332 of the web browser may be modified prior to being transmitted to the expert device 130 for viewing by the expert. More specifically, the video frames may be modified using the techniques discussed above with reference to FIG. 2 to mask the sensitive information (e.g., username 372, phone number 374, e-mail address 376, and date of birth 378). For example, the video frames may be modified by placing an opaque polygon over the portions of the video frames that depict the sensitive information. The modified video frames may then be transmitted to the expert device 130 for viewing by the expert as depicted in FIG. 3E.

Figure 4:
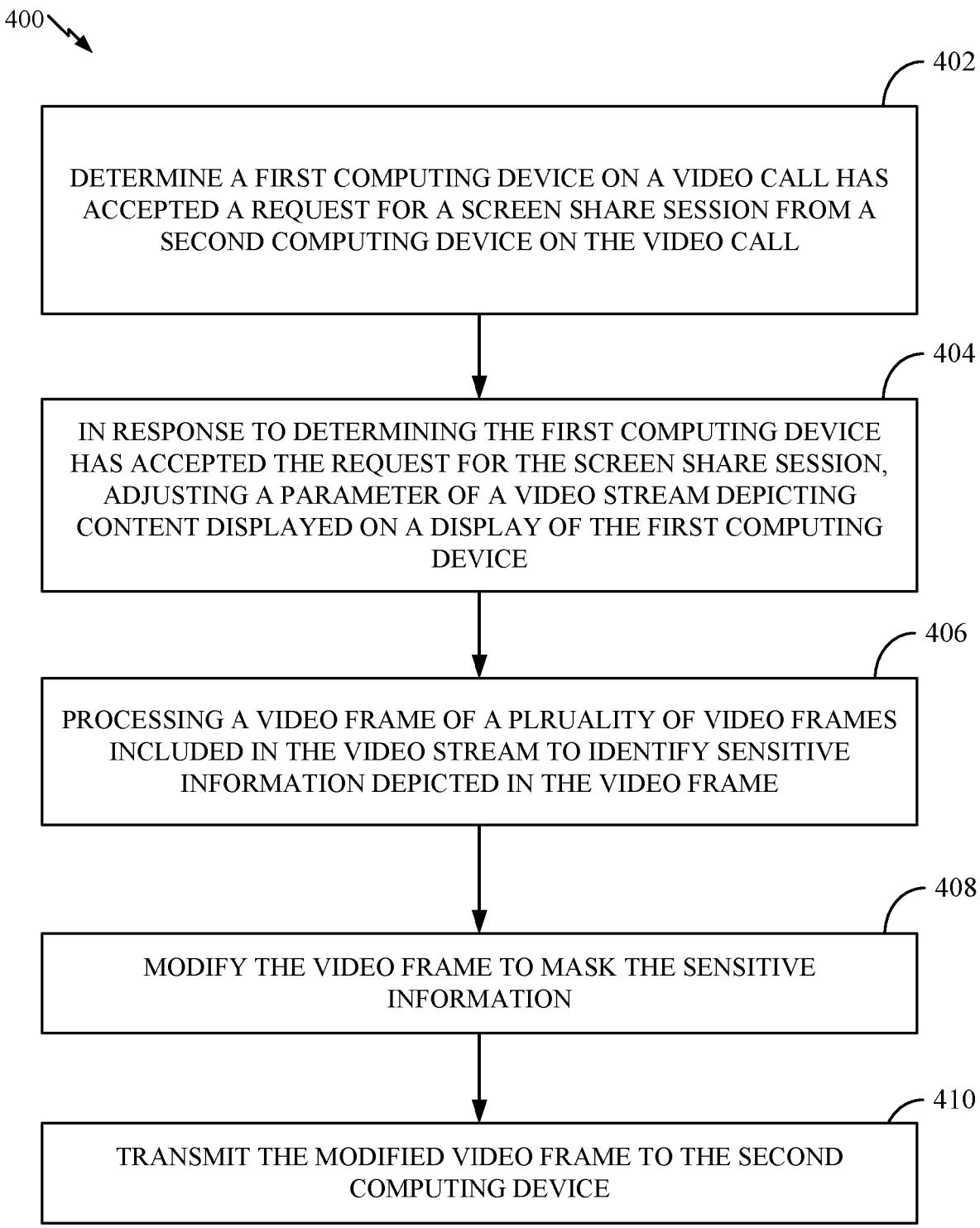
FIG. 4 depicts a method for real-time masking of personal information during a screen share session of a video call according to some aspects of the present disclosure.

Example Method for Real-Time Masking of Sensitive Information in Content Shared During a Screen Share Session of a Video Call FIG. 4 is a flow diagram of an example operations 400 for real-time masking of sensitive information included in content shared during a screen share session of a video call according to some embodiments of the present disclosure. The operations 400 may be performed by instructions executing on a processor of a server (such as the server 110 of FIG. 1).

Operation 402 includes determining a first computing device (e.g., the client device illustrated in FIG. 1) on the video call accepted a request for the screen share session from a second computing device (e.g., the expert device 130 illustrated in FIG. 1) on the computing device. In some embodiments, acceptance of the request for the screen share session may be determined based, at least in part, on user-input provided at the first computing device in response to a display of the first computing device displaying a notification (e.g., the notification window 322 illustrated in FIG. 3A).

Operation 404 includes adjusting a parameter of a video stream associated with the screen share session and depicting content displayed on a display of the first computing device in response to determining the first computing device has accepted a request for the screen share session from the second computing device at operation 402. For instance, in some embodiments, adjusting the parameter of the video stream may include adjusting a frame rate of the video stream. More specifically, adjusting the frame rate may include reducing the frame rate from a first frame rate (e.g., ranging from 20 frames per second to 60 frames per second) to a second frame rate (e.g., ranging from 1 frame per second to 3 frames per second) that provides additional time to perform the image processing and text recognition techniques discussed above with reference to FIG. 2 as well as discussed below in subsequent elements (e.g., steps) of operation 400 in real-time or near-real time so as to avoid any delay (e.g., lag) associated with the video stream.

Operation 406 includes processing a video frame of the plurality of video frames to identify sensitive information depicted in the video frame. For example, in some embodiments, processing the video frame may include applying one or more image processing techniques to extract text included in the video frame and may further include applying one or more search techniques to the extracted text to determine whether the extracted text includes the sensitive information.

Operation 408 includes modifying the video frame to mask the sensitive information. For example, in some embodiment, modifying the video frame to mask the sensitive information may include identifying one or more locations of the video frame that include the sensitive information and positioning an opaque polygon over the one or more locations of the video frame to mask the sensitive information.

Operation 410 includes transmitting the modified video frame to the second computing device for viewing on a display of the second computing device. For example, in some embodiments, the modified video frame may be communicated from the first computing device to the second computing device via one or more networks (e.g., the network 140 illustrated in FIG. 1).

In some embodiments, operations 406, 408, and 410 may be performed as an iterative loop for each video frame included in the video stream. For example, each of the plurality of frames in the video stream may be processed at operation 406, modified at operation 408 if needed, and transmitted to the second computing device at operation 410. In some embodiments, each of the video frames of the video stream may be transmitted one at a time. In alternative embodiments, multiple of the video frames may be transmitted at the same time.

In some embodiments, the operations 400 may include determining the screen share session has ended based, at least in part, on user-input provided at the first computing device. For example, the user-input may include user-selection (e.g., clicking, touching, etc.) of a user-interface control (e.g., user-interface control 354 illustrated in FIG. 3C) displayed on the screen of the first computing device during the screen share session between the first computing device and the second computing device. More specifically, selection of the user-interface control may end the screen share session such that content on the screen of the first computing device can no longer be viewed on the screen of the second computing device.

Example Computing Systems

Figure 5A:
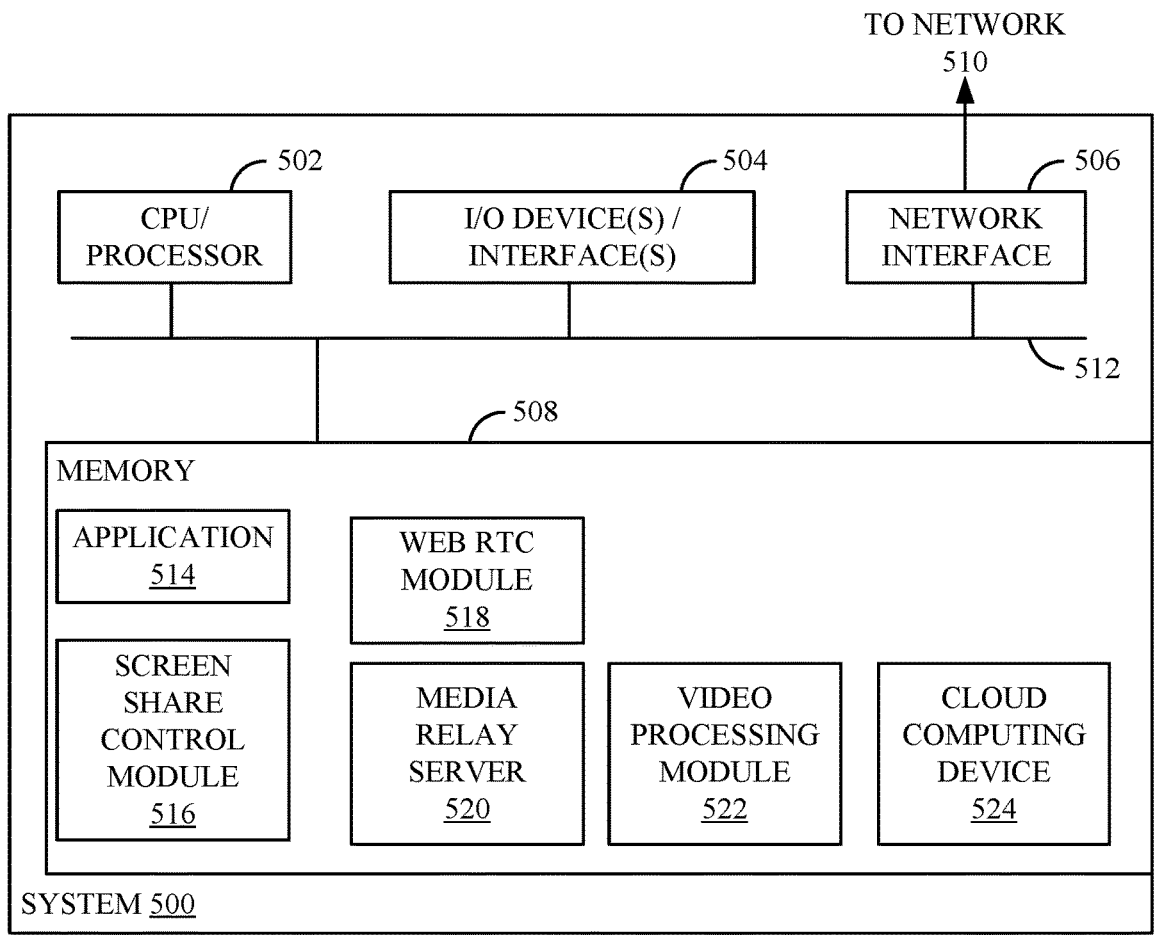
FIGS. 5A and 5B depict example processing systems according to some embodiments of the present disclosure.

FIG. 5A illustrates an example computing system 500 with which embodiments of the disclosure related to real-time masking of content shared during a screen share session of a video call may be implemented. For example, the computing system 500 may be representative of the server 110 of FIG. 1.

The computing system 500 includes a central processing unit (CPU) 502, one or more I/O device interfaces 504 that may allow for the connection of various I/O devices 504 (e.g., keyboards, displays, mouse devices, pen input, etc.) to the computing system 500, a network interface 506, a memory 508, and an interconnect 512. It is contemplated that one or more components of the computing system 500 may be located remotely and accessed via a network 510. It is further contemplated that one or more components of the computing system 500 may include physical components or virtualized components.

The CPU 502 may retrieve and execute programming instructions stored in the memory 508. Similarly, the CPU 502 may retrieve and store application data residing in the memory 508. The interconnect 512 transmits programming instructions and application data, among the CPU 502, the I/O device interface 504, the network interface 506, the memory 508. The CPU 502 is included to be representative of a single CPU, multiple CPUs, a single CPU having multiple processing cores, and other arrangements.

Additionally, the memory 508 is included to be representative of a random access memory or the like. In some embodiments, the memory 508 may include a disk drive, solid state drive, or a collection of storage devices distributed across multiple storage systems. Although shown as a single unit, the memory 508 may be a combination of fixed and/or removable storage devices, such as fixed disc drives, removable memory cards or optical storage, network attached storage (NAS), or a storage area-network (SAN).

As shown, the memory 508 includes application 514, screen share control module 516, Web RTC module 518, media relay server 520, video processing module 522 and cloud computing module 524, which may be representative of application 150, screen share control module 204, Web RTC module 208, media relay server 214, video processing module 218, and cloud computing device 222 of FIGS. 1 and 2.

Figure 5B:
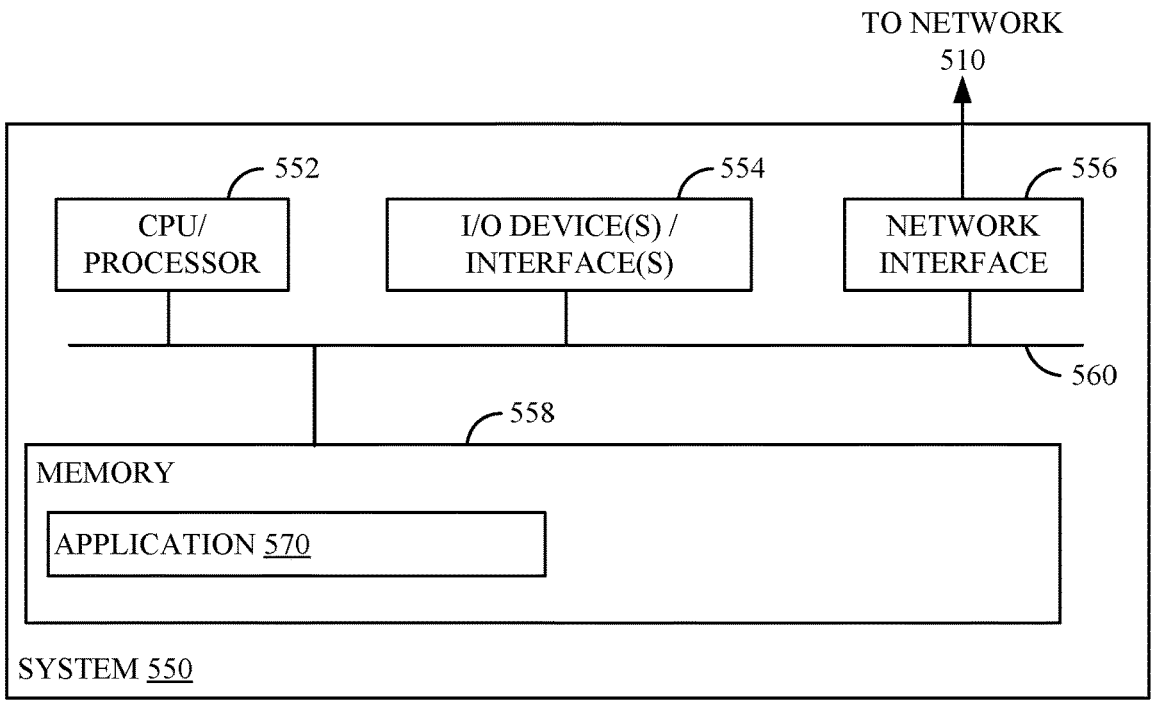

FIG. 5B illustrates an example computing system 550 with which embodiments of the disclosure related to automatically recommending a personalized estimate of an amount of time needed for a user to complete a task may be implemented. For example, the computing system 550 may be representative of the client device 120 and expert device 130 of FIG. 1.

The computing system 550 includes a central processing unit (CPU) 552, one or more I/O device interfaces 554 that may allow for the connection of various I/O devices 554 (e.g., keyboards, displays, mouse devices, pen input, etc.) to the computing system 550, a network interface 556, a memory 558, and an interconnect 560. It is contemplated that one or more components of the computing system 550 may be located remotely and accessed via the network 510. It is further contemplated that one or more components of the computing system 550 may include physical components or virtualized components.

The CPU 562 may retrieve and execute programming instructions stored in the memory 558. Similarly, the CPU 552 may retrieve and store application data residing in the memory 558. The interconnect 560 transmits programming instructions and application data, among the CPU 552, the I/O device interface 554, the network interface 556, the memory 558. The CPU 552 is included to be representative of a single CPU, multiple CPUs, a single CPU having multiple processing cores, and other arrangements.

Additionally, the memory 558 is included to be representative of a random access memory or the like. In some embodiments, the memory 558 may include a disk drive, solid state drive, or a collection of storage devices distributed across multiple storage systems. Although shown as a single unit, the memory 558 may be a combination of fixed and/or removable storage devices, such as fixed disc drives, removable memory cards or optical storage, network attached storage (NAS), or a storage area-network (SAN). As shown, the memory 558 may include a software application 570, such as the application 150 discussed above with reference to FIG. 1.

ADDITIONAL CONSIDERATIONS

The preceding description provides examples, and is not limiting of the scope, applicability, or embodiments set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

The preceding description is provided to enable any person skilled in the art to practice the various embodiments described herein. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and other operations. Also, "determining" may include receiving (e.g., receiving information), accessing (e.g., accessing data in a memory) and other operations. Also, "determining" may include resolving, selecting, choosing, establishing and other operations.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

A processing system may be implemented with a bus architecture. The bus may include any number of interconnecting buses and bridges depending on the specific application of the processing system and the overall design constraints. The bus may link together various circuits including a processor, machine-readable media, and input/output devices, among others. A user interface (e.g., keypad, display, mouse, joystick, etc.) may also be connected to the bus. The bus may also link various other circuits such as timing sources, peripherals, voltage regulators, power management circuits, and other types of circuits, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media, such as any medium that facilitates transfer of a computer program from one place to another. The processor may be responsible for managing the bus and general processing, including the execution of software modules stored on the computer-readable storage media. A computer-readable storage medium may be coupled to a processor such that the processor can read information from, and write information to, the storage medium. In the alternative, the storage medium may be integral to the processor. By way of example, the computer-readable media may include a transmission line, a carrier wave modulated by data, and/or a computer readable storage medium with instructions stored thereon separate from the wireless node, all of which may be accessed by the processor through the bus interface. Alternatively, or in addition, the computer-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module, it will be understood that such functionality is implemented by the processor when executing instructions from that software module.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for real-time masking of sensitive information in content shared during a screen share session of a video call, the method comprising:
   determining a first computing device on the video call has accepted a request for the screen share session from a second computing device on the video call;
   in response to the determining, adjusting a parameter of a video stream depicting content displayed on a display of the first computing device;
   processing a first video frame of a plurality of video frames included in the video stream to identify sensitive information depicted in the first video frame;
   modifying the first video frame to mask the sensitive information;
   transmitting the modified first video frame to the second computing device;
   determining that a second video frame that immediately follows the first video frame differs from the first video frame by a threshold amount; and
   in response to determining that the second video frame differs from the first video frame by the threshold amount, processing the second video frame to identify sensitive information depicted in the second video frame.

2. The method of claim 1, wherein adjusting the parameter of the video stream comprises adjusting a frame rate of the video stream.

3. The method of claim 2, wherein adjusting the frame rate comprises reducing the frame rate from a first frame rate to a second frame rate.

4. The method of claim 3, wherein:
   the first frame rate ranges from 20 frames per second to 60 frames per second; and
   the second frame rate ranges from 1 frame per second to 3 frames per second.

5. The method of claim 1, wherein processing the first video frame comprises:
   applying one or more image processing techniques to the first video frame to extract text depicted in the first video frame; and
   applying one or more search techniques to the extracted text to determine the extracted text includes the sensitive information.

6. The method of claim 5, wherein modifying the first video frame to mask the sensitive information depicted in the video frame comprises:
   identifying one or more coordinates of the first video frame that include the sensitive information; and
   applying an opaque polygon over the one or more coordinates.

7. The method of claim 1, wherein determining the second video frame differs from the first video frame by the threshold amount comprises:
   converting the first video frame to a first grayscale video frame;
   converting the second video frame from a second grayscale video frame;
   determining an aggregated grayscale value of the first grayscale video frame;
   determining an aggregated grayscale value of the second grayscale video frame; and
   determining the aggregated grayscale value of the second grayscale video frame differs from the aggregated grayscale value of the first grayscale video frame by the threshold amount.

8. A system for real-time masking of sensitive information in content shared during a screen share session of a video call, the system comprising:
   one or more processors; and
   one or more memory configured to store computer executable instructions that, when executed by the one or more processors, cause the one or more processors to:

determine a first computing device on the video call has accepted a request for the screen share session from a second computing device on the video call;

in response to determining the first computing device accepted the request for the screen share session, adjust a parameter of a video stream depicting content displayed on a display of the first computing device;

process a first video frame of a plurality of video frames included in the video stream to identify sensitive information depicted in the video frame;

modify the first video frame to mask the sensitive information;

transmit the modified first video frame to the second computing device;

determine that a second video frame that immediately follows the first video frame differs from the first video frame by a threshold amount; and in response to determining that the second video frame differs from the first video frame by the threshold amount, process the second video frame to identify sensitive information depicted in the second video frame.

9. The system of claim 8, wherein the parameter comprises a frame rate of the video stream.

10. The system of claim 9, wherein to adjust the frame rate of the video stream, the one or more processors are configured to reduce the frame rate of the video stream from a first frame rate to a second frame rate.

11. The system of claim 10, wherein:
the first frame rate ranges from 20 frames per second to 60 frames per second; and
the second frame rate ranges from 1 frame per second to 3 frames per second.

12. The system of claim 8, wherein to process the first video frame, the one or more processors are configured to:
apply one or more image processing techniques to the first video frame to extract text depicted in the first video frame; and
apply one or more search techniques to the extracted text to determine the extracted text includes the sensitive information.

13. The system of claim 12, wherein to modify the first video frame, the one or more processors are configured to:
identify one or more coordinates of the first video frame that include the sensitive information; and
apply an opaque polygon to the one or more coordinates.

14. The system of claim 10, wherein to determine the second video frame differs from the first video frame by the threshold amount, the computer executable instructions, when executed by the one or more processors, further cause the one or more processors to:
convert the first video frame to a first grayscale video frame;
convert the second video frame from a second grayscale video frame;
determine an aggregated grayscale value of the first grayscale video frame;
determine an aggregated grayscale value of the second grayscale video frame; and
determine the aggregated grayscale value of the second grayscale video frame differs from the aggregated grayscale value of the first grayscale video frame by the threshold amount.

15. The system of claim 8, wherein the content comprises a hand-written document.

16. A non-transitory computer-readable medium comprising instructions to be executed in a computer system for real-time masking of sensitive information in content shared during a screen share session of a video call, wherein the instructions, when executed in the computer system, cause the computer system to:
determine a first computing device on the video call has accepted a request for the screen share session from a second computing device on the video call;
in response to determining the first computing device accepted the request for the screen share session, adjust a parameter of a video stream depicting content displayed on a display of the first computing device;
process a first video frame of a plurality of video frames included in the video stream to identify sensitive information depicted in the video frame;
modify the first video frame to mask the sensitive information;
transmit the modified first video frame to the second computing device;
determine that a second video frame that immediately follows the first video frame differs from the first video frame by a threshold amount; and
in response to determining that the second video frame differs from the first video frame by the threshold amount, process the second video frame to identify sensitive information depicted in the second video frame.

* * * * *